US009713073B2

(12) United States Patent
Sirotkin et al.

(10) Patent No.: US 9,713,073 B2
(45) Date of Patent: Jul. 18, 2017

(54) CELL POSITIONING IN CELLULAR NETWORK

(71) Applicant: INTEL IP CORPORATION, Santa Clara, CA (US)

(72) Inventors: Alexander Sirotkin, Giv'on Hachadasha (IL); Itai Steiner, Tel Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/779,996

(22) PCT Filed: May 1, 2014

(86) PCT No.: PCT/US2014/036284
§ 371 (c)(1),
(2) Date: Sep. 25, 2015

(87) PCT Pub. No.: WO2014/182530
PCT Pub. Date: Nov. 13, 2014

(65) Prior Publication Data
US 2016/0057697 A1    Feb. 25, 2016

Related U.S. Application Data

(60) Provisional application No. 61/820,021, filed on May 6, 2013.

(51) Int. Cl.
*H04W 80/04*    (2009.01)
*H04W 36/18*    (2009.01)
(Continued)

(52) U.S. Cl.
CPC ............ *H04W 48/14* (2013.01); *H04W 4/025* (2013.01); *H04W 4/22* (2013.01); *H04W 8/005* (2013.01);
(Continued)

(58) Field of Classification Search
CPC .. H04W 80/04; H04W 36/18; H04W 36/0011
(Continued)

(56) References Cited

U.S. PATENT DOCUMENTS 6,664,923 B1    12/2003    Ford
8,180,368 B2    5/2012    Anderson et al.
(Continued)

FOREIGN PATENT DOCUMENTS

WO    2013028128    2/2013
WO    2013054122    4/2013

OTHER PUBLICATIONS

International Search Report and Written Opinion for PCT/US2014/036284, mailed on Mar. 8, 2016, 9 pages.
(Continued)

*Primary Examiner* — Ronald B Abelson
(74) *Attorney, Agent, or Firm* — Schwabe, Williamson & Wyatt, P.C.

(57) ABSTRACT

An apparatus, a system and a method for configuring a User Equipment (UE) position. For example, a UE may be configured to receive a cell ID parameter and a cell size parameter, to configure a cell position based on the cell ID, and to configure the UE position based on the cell size. The UE may be configured, for example, to connect to Access points (APs) of a Wireless local Area Network (WLAN) in its close vicinity, e.g., based on the determined position of the UE.

23 Claims, 7 Drawing Sheets

(51) Int. Cl.
*H04W 36/00* (2009.01)
*H04W 48/14* (2009.01)
*H04W 48/16* (2009.01)
*H04W 48/18* (2009.01)
*H04W 4/22* (2009.01)
*H04W 8/00* (2009.01)
*H04W 56/00* (2009.01)
*H04W 4/02* (2009.01)
*H04W 8/02* (2009.01)
*H04W 36/24* (2009.01)
*H04W 48/20* (2009.01)
*H04W 76/02* (2009.01)
*H04W 84/04* (2009.01)
*H04W 84/18* (2009.01)

(52) U.S. Cl.
CPC ........... *H04W 8/02* (2013.01); *H04W 36/245* (2013.01); *H04W 48/16* (2013.01); *H04W 48/18* (2013.01); *H04W 48/20* (2013.01); *H04W 56/001* (2013.01); *H04W 76/02* (2013.01); *H04W 84/045* (2013.01); *H04W 84/18* (2013.01)

(58) Field of Classification Search
USPC ........................................................ 370/331
See application file for complete search history.

(56) References Cited

U.S. PATENT DOCUMENTS

| 2003/0148774 | A1 | 8/2003 | Naghian et al. |
| 2006/0128383 | A1 | 6/2006 | Arcens |
| 2010/0156706 | A1 | 6/2010 | Farmer et al. |
| 2010/0323723 | A1* | 12/2010 | Gerstenberger ...... G01S 5/0226 455/456.5 |

OTHER PUBLICATIONS

International Preliminary Report on Patentability for PCT/US2014/036284, mailed on Mar. 24, 2016, 8 pages.

Office Action of Taiwanese Patent Application No. 103115953, mailed on Aug. 20, 2015, 7 pages (including 1 page of English translation).

3GPP TS 24.312 V12.0.0 (Mar. 2013), Technical Specification, 3rd Generation Partnership Project; Technical Specification Group Core Network and Terminals; Access Network Discovery and Selection Function (ANDSF) Management Object (MO) (Release 12), 173 pages.

3GPP TS 36.300 V11.5.0 (Mar. 2013), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 209 pages.

3GPP TS 36.331 V11.3.0 (Mar. 2013), Technical Specification, 3rd Generation Partnership Project; Technical Specification Group Radio Access Network; Evolved Universal Terrestrial Radio Access (E-UTRA); Radio Resource Control (RRC); Protocol specification (Release 11), 344 pages.

3GPP TR 37.834 V0.2.0 (Apr. 2013), Technical Report, 3rd Generation Partnership Project; Technical Specification Group Radio Access Network; Study on WLAN/3GPP Radio Interworking (Release 12), 9 pages.

3GPP TS 23.402 V11.6.0 (Mar. 2013), Technical Specification, 3rd Generation Partnership Project; Technical Specification Group Services and System Aspects; Architecture enhancements for non-3GPP accesses (Release 11), 252 pages.

3GPP TS 36.304 V11.3.0 (Mar. 2013), Technical Specification, 3rd Generation Partnership Project; Technical Specification Group Radio Access Network; Evolved Universal Terrestrial Radio Access (E-UTRA); User Equipment (UE) procedures in idle mode (Release 11), 34 pages.

* cited by examiner

CELL POSITIONING IN CELLULAR NETWORK

CROSS REFERENCE

This application is a National Phase Application of PCT/US2014/036284, filed on May 1, 2014, which claims the benefit of and priority from U.S. Provisional Patent Application Ser. No. 61/820,021, filed May 6, 2013, the entire disclosures of both of which are incorporated herein by reference.

TECHNICAL FIELD

Some embodiments described herein generally relate to cell positioning in cellular network.

BACKGROUND

Wireless mobile communication technology uses various standards and protocols to transmit data between a transmission station and a wireless mobile device. Some wireless devices communicate using orthogonal frequency-division multiplexing (OFDM) combined with a digital modulation scheme via a physical layer. Some standards and protocols that use OFDM include, for example, the third generation partnership project (3GPP) long term evolution (LTE), the Institute of Electrical and Electronics Engineers (IEEE) 802.16 standard (e.g., IEEE 802.16e, IEEE 802.16m), which is commonly known to industry groups as WiMAX (Worldwide interoperability for Microwave Access), and the IEEE 802.11 standard, which is commonly known to industry groups as WiFi.

In 3GPP LTE, an Evolved Universal Terrestrial Radio Access Network (E-UTRAN) includes transmission stations (also commonly referred to as evolved Node Bs, enhanced Node Bs, Home enhanced node B (HeNB), UTRAN NodeBs, eNodeBs, or eNBs), which communicate with a wireless mobile device, also known as a user equipment (UE). A downlink (DL) transmission may be a communication from the transmission station (or eNodeB) to the wireless mobile device (or UE), and an uplink (UL) transmission may be a communication from the wireless mobile device to the transmission station. The transmission station may be connected to a Mobility Management Entity (MME), which may be located in the core network, by means of an S1 interface and/or an X2 interface.

In cellular systems such as, for example, LTE cellular systems, a user equipment (UE), for example, a cellphone, may estimate its position, while traveling from one cell to another cell, by using Cell Identification (ID) information. The Cell ID may include a cell identifier broadcast by a cellular network. However, in some circumstances the accuracy of a location estimation based on the Cell ID may be very low. Thus, there is a need to improve the accuracy of the location estimation.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

Figure 1:
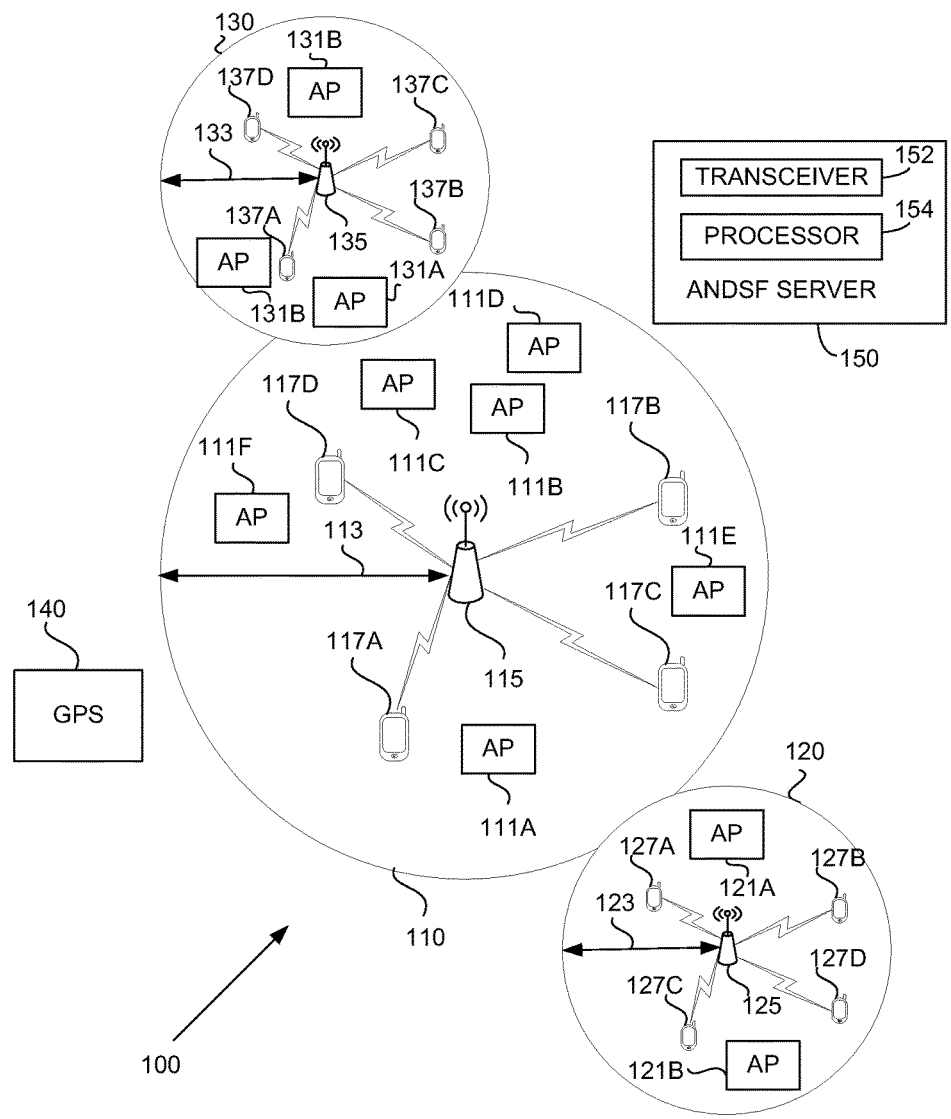
FIG. 1 is a schematic block diagram illustration of a cellular system, in accordance with some demonstrative embodiments.

Reference will now be made to the exemplary embodiments illustrated, and specific language will be used herein to describe the same. It will nevertheless be understood that no limitation of the scope of the disclosure is thereby intended.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a cellular network, a cellular node, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications, e.g., "3GPP TS 36.304 3rd Generation Partnership Project; Technical Specification Group Radio Access Network; Evolved Universal Terrestrial Radio Access (E-UTRA); User Equipment (UE) procedures in idle mode"; "3GPP TS 36.331 3rd Generation Partnership Project; Technical Specification Group Radio Access Network; Evolved Universal Terrestrial Radio Access (E-UTRA); Radio Resource Control (RRC); Protocol specification"; "3GPP 24.312 3rd Generation Partnership Project; Technical Specification Group Core Network and Terminals; Access Network Discovery and Selection Function (ANDSF) Management Object (MO)"; and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, 5G, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1xRTT), Evolution-Data Optimized (EV-DO), Enhanced Data rates for GSM Evolution (EDGE), and the like. Other embodiments may be used in various other devices, systems and/or networks.

The phrase "wireless device" and/or "mobile device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" and/or "mobile device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated, for example, in system information transmitted on the downlink resources.

An initial overview of technology embodiments is provided below and then specific technology embodiments are described in further detail later. This initial overview is intended to aid readers in understanding the technology more quickly but is not intended to identify key features or essential features of the technology nor is it intended to limit the scope of the claimed subject matter.

A user equipment (UE) of a cellular system, for example, an LTE advance cellular system, may handover from one cell to another, or may reselect a cell while traveling from one location to another location. The cell may be presented to the UE by its cell identification (ID).

In some demonstrative embodiments, cell size information corresponding to a cell may be provided to the UE, for example, by a node of the cell or by another entity, e.g., an Access Network Discovery and Selection (ANDSF) server, as described below. The cell size information may include information of a parameter corresponding to a size of the cell, for example, a cell radius, a cell diameter, a cell area, and the like, e.g., as described below.

In some demonstrative embodiments, the cell size information may be used by the UE in a number of ways. For example, the cell size information may be used by the UE for WLAN access network discovery and/or for enhanced cell ID location, e.g., as described below.

According to some demonstrative embodiments, the UE may use enhanced cell ID and cell size information for WLAN access network discovery. In one example, the UE may select whether to relay on cell ID positioning or not based on the cell size information. For example, if the UE has information regarding WLAN AP locations (this information may be retrieved, for example, via ANDSF, pre-provisioned in the UE or delivered to the UE in any other way), the UE may select to rely on cell ID positioning, e.g., if the UE is within the coverage of a sufficiently small cell. The UE may select to fall back to other methods, e.g., less energy efficient methods, such as, for example Global Navigation Satellite System (GNSS), e.g., if the UE is not within the coverage of a sufficiently small cell.

In some demonstrative embodiments, one or more of the navigation techniques described below and/or any other techniques and/or methods may be utilized to perform one or more location and/or positioning operations.

Multilateration is a navigation technique, which is based on the measurement of the difference in distances to two stations at known locations, which broadcast signals at known times. Trilateration is the process of determining absolute or relative locations of points by measurement of distances, using the geometry of circles, spheres or triangles. Enhanced Observed Time Difference (EOTD) is a navigation technique for the location of mobile telephones. This location method works by multilateration, and based on the UE observation of the time difference of arrival of signals from two different base stations. Observed Time Difference Of Arrival (OTDF) is a multilateration method in which the UE may measure the time difference between some specific signals from a plurality of eNBs, and may report these time differences to a service mobile location center in the network. Uplink Time Difference Of Arrival (UTDOA) is a method to determine the location of the UE based on the time it takes a signal to travel from the UE to each of a plurality of Location Measurement Units (LMUs), which may be located at the network. By using the timing information from multiple LMUs, U-TDOA may calculate the UE position, if desired.

In some exemplary embodiments, the cell size information may provide a boundary condition for positioning equations of a positioning algorithm, e.g., the multilateration or trilateration position equations. Cell-based location technologies such as, for example, EOTD, OTDOA, UTDOA and Cell-ID and/or enhanced Cell-ID, may be optimized to reduce the frequency of measurements, which may be required to produce a position, for example, in order to preserve power, e.g., if the cell size is of magnitude of a desired position accuracy.

Some demonstrative embodiments may use Fusion/Hybrid Location Systems for finding the position of the UE. The fusion/Hybrid Location systems may use a plurality of different positioning technologies. For example, the positioning technologies may include a combination of Global Positioning System (GPS) signals with cell tower signals, wireless internet signals, Bluetooth sensor signals, IP addresses and network environment data, and/or any other local Positioning Systems signals and/or data, if desired.

For example, a WLAN AP may use a Signal Strength Indicator (RSSI) positioning method to store and report the position of a mobile device under a WLAN environment. In some demonstrative embodiments, the WLAN AP may use cell size information, for example, in order to optimize the scanning frequency, and/or as indication for non-significant position change. A Fusion/Hybrid Location System may use the cell size information, for example, as additional input to the overall equation system such as, for example, a Kalman filter, which may be derived from various measurements, sensors and sources, as a boundary condition and/or by reducing the measurement of other sources, such as, for example, Wi-Fi fine-time-measurement (Time-Of-Flight), Global Navigation Satellite System (GNSS), inertial sensors, and the like.

A Kalman filter may include a two-step algorithm, e.g., a prediction step and an update step. In the prediction step, the Kalman filter may produce estimates of the current state variables, along with their uncertainties. At the update state, measurements, e.g., GPS signals and cell size, which may be corrupted with some amount of error, including random noise, may be updated using a weighted average, with more weight being given to estimates with higher certainty.

In some demonstrative embodiments, the UE may use the Cell ID and the cell size to estimate its position The UE may apply a method of configuring its position based on the cell ID parameter and the cell size.

Advantageously, in some cases, for example, in the case of a small cell deployment, the knowledge of cell size in addition to cell ID may provide significant benefits for location services, WLAN scanning optimizations and potentially other usages.

Reference is made to FIG. 1, which schematically illustrates a cellular system 100, in accordance with some demonstrative embodiments. For example cellular system 100 may include a cell 110, a cell 120, a cell 130, a GPS 140 and an Access Network Discovery and Selection (ANDSF) server 150.

For example, cell 110 may include a plurality of APs 111A-F of a WLAN, a base station 115, which may include, for example, an eNB, and a plurality of UEs 117A-D. Cell 120 may include a plurality of APs 121A-F of a WLAN, a base station 125, which may include, for example, an eNB, and a plurality of UEs 127A-D. Cell 130 may include a plurality of APs 131A-F of a WLAN, a base station 135, which may include, for example, an eNB, and a plurality of UEs 137A-D.

In some demonstrative embodiments, ANDSF server 150 may include a transceiver 152 and a processor 154. Transceiver 152 may include circuitry and/or logic configured to receive and transmit location information to the UEs, e.g., UE 117A-D, UE 127A-D and UE 137A-D. Processor 154 may include circuitry and/or data to process location information, if desired.

In operation, UE 127A, for example, a mobile phone, may travel from one place to another place, for example, from cell 120 to cell 130, if desired. When traveling, UE 127A, e.g., the mobile phone, may count a number of handovers and/or a number of cell reselection and/or a number, which is a combination of handovers and cell reselections. For example, UE 127A may count 2 cell handovers, although it should be understood that in other embodiments any other number of cell recollections/handovers may be counted by the UE.

In some demonstrative embodiments, a cell radius 113 may be utilized for estimating the cell size of cell 110, a cell radius 123 may be utilized for estimating the cell size of cell 120, and/or a cell radius 133 may be utilized for estimating the cell size of cell 130, e.g., as described below.

In some demonstrative embodiments, while traveling, UE 127A, e.g., the mobile phone, may receive, for example, from eNB 125, a cell ID parameter and a cell size parameter of cell 120. The cell size parameter of cell 120 may include, for example, cell radius 123. UE 127A, e.g., the mobile phone, may receive, for example, from eNB 115, a cell ID parameter and a cell size parameter of cell 110. The cell size parameter of cell 110 may include, for example, cell radius 113. UE 127A, e.g., the mobile phone, may receive, for example, from eNB 135, a cell ID parameter and a cell size parameter of cell 130 wherein the cell size of cell 130 may include, for example, cell radius 133.

Some demonstrative embodiments are described herein with respect to a cell size being represented by a cell radius. However, in other embodiments the cell size of a cell may be represented by any other cell size parameter, for example, a cell diameter, perimeter, area, and/or any other parameter, in addition to or instead of, the cell radius, and/or any combination and/or function of one or more of the parameters.

According to some embodiments, UE 127A may estimate the location of cells 110, 120 and 130, for example, based on the respective cell IDs of cells 110, 120 and 130.

In some demonstrative embodiments, UE 127A may estimate its own location, e.g., a location of the mobile phone, based, for example, on the number of cell reselections and/or handovers weighted by the cell size parameter of each cell.

In some demonstrative embodiments, GPS 140 may provide position coordinates to UE 127A. UE 127A may combine GPS 140 signals with positioning information of eNB 115, eNB 125, or eNB 135, and/or any other positioning singles from different resources, in order to estimate the accurate position of UE 127A. For example, UE 127A may use the cell size information as a boundary condition to an overall equation system for estimating the position of UE 127A.

In another example, UE 127 may apply a Kalman filter to the GPS signal and the cell size, for example, in order to estimate an accurate position of UE 127, if desired. The advantage of using cell size information may be in reducing the measurement of other sources, such as Wi-Fi fine-time-measurement (Time-Of-Flight), Global Navigation Satellite System (GNSS), inertial sensor, and more.

According to some demonstrative embodiments, for example, UE 127A may use the cell size information in order to connect to an AP in its close vicinity. For example, UE 127A may connect to AP 121A, if desired.

According to some demonstrative embodiments, the Cell ID information may also be used by other applications. For example, an Access Network Discovery and Selection Function (ANDSF) may enable the UE to use cell ID location information to estimate presence of WLAN access points (APs) in its vicinity, e.g., in order to optimize WLAN scanning. However, when the location of the UE is not accurate, other energy consuming operations need to be used in order to provide a more accurate estimation of the location of the UE and/or the WLAN APs Reference is made to FIG. 2, which schematically illustrates a system on chip (SoC) 200, in accordance with some demonstrative embodiments. For example, SoC 200 may include a processor 210, an AP 220, a GPS 230, an LTE modem 240 and a memory 250. However it should be understood that this example is not limited and other modules and/or hardware circuitry and/or logic such as graphic module, USB and etc. may be included in SoC 200, if desired.

For example, processor 210 may include circuitry and/or logic of a single core processor, a dual core processor a triple core processor a quadrature core processor or the like. In addition, processor 210 may include circuitry and/or logic of an application processor. AP 220 may include circuitry and/or logic, which may operate according to the IEEE 802.11n standard, the IEEE 802.11-2012 standard, the IEEE 8020.11ad-2012 standard, the IEEE 802.11ac standard, or the like. LTE modem 240 may include circuitry and/or logic, which may operate according to LTE release 8, LTE release 9, LTE advanced release 10, LTE advanced release 11, LTE advanced release 12 and/or higher releases. Memory 250 may include circuitry and/or logic of a Flash memory, a non-volatile memory, a volatile memory, or the like.

According to some demonstrative embodiments, for example, SoC 200 may be included in a mobile phone of a cellular system, e.g., a LTE advance system, and may be configured to estimate the position of the mobile phone. For example LTE modem 240 may include circuitry and/or logic configured to receive a cell identification (ID) parameter and a cell size parameter, and to estimate the cell position based on the cell ID parameter and the cell size parameter. For example, the cell size parameter may include a diameter or radius of the cell in meters.

In some demonstrative embodiments, LTE modem 240 may include circuitry and/or logic configured to receive a system information block (SIB). The SIB may include the cell size parameter and WLAN information. LTE modem 240 may include circuitry and/or logic configured to estimate the UE location based on the cell size, and to select an AP of the WLAN based on the UE location and the WLAN information, if desired.

According to another demonstrative embodiment, for example, LTE modem 240 may include circuitry and/or logic configured to receive an ANDSF Management Object (MO). The ANDSF MO may include the cell size parameter and WLAN information. LTE modem 240 may include circuitry and/or logic to configure the mobile phone location based on the cell size, and to select an AP of the WLAN based on the UE location, if desired.

In some demonstrative embodiments, when selecting the WLAN AP, the LTE modem 240 may calculate and/or estimate the mobile phone position based on the cell ID and the cell position, an may search a database in memory 250 for APs located in the vicinity of the mobile phone. For example, when configuring the mobile phone position and/or the UE position, LTE modem 240 may be configured to use multilateration or trilateration position equations. The cell size parameter may be used as a boundary for the multilateration or trilateration position equations. WLAN 220 may be configured to connect to the WLAN AP, which is in the closest vicinity of the mobile phone, for example, according to the database of APs stored at memory 250, if desired.

A "Legacy" Mobility State Estimation mechanism in idle mode may be designed with macro cell deployments in mind. However, as macro cells are all roughly of equal size, the legacy mechanism may not work well in heterogeneous network deployments, in which case cell sizes may vary greatly. Roughly speaking, 3 macro cell (which may have 1 km diameter) reselections per minute (numbers are arbitrary) is not the same as 3 small cell (which may be 100 m in diameter) reselections per minute.

According to some demonstrative embodiments, for example, the UE may perform an enhanced Mobility state estimation (eMSE) in idle mode. For example, the UE may count the distance it has traveled by using the cell size parameter. The UE may add the cell size of each cell it has handover an/or reselected and may use the number of handovers and/or reselections weighted with the sum of cell sizes, for example, as a threshold to enter one of a plurality of mobility states, e.g., high, medium or normal. The threshold may be designated in meters, although other units may be used with other embodiments.

More specifically and according to another demonstrative embodiment, LTE modem 240 may estimate a UE mobility state based on the cell ID and the cell size, and may configure an enhanced mobility state estimation (eMSE). LTE modem 240 may decide whether to connect or disconnect to the WLAN AP and/or to make a decision of next cell reselection based on the eMSE, if desired.

For example, LTE modem 240 may estimate the UE mobility state by counting a number of cell reselections and/or counting a number of cell handovers. The UE mobility state may include, for example, a high state, a medium state, and a normal state. The LTE modem 240 may weigh the number of cell reselections and/or the number of cell handovers according to the cell size, and may calculate a distance traveled by the mobile phone and/or the UE based on the number of cell reselections and/or the number of cell handovers, and the cell size parameter. In one example, LTE modem 240 may use the distance traveled by the UE and/or the mobile phone as a threshold, and may select the UE mobility state according to the distance traveled by the UE and/or the mobile phone, if desired.

Figure 3:
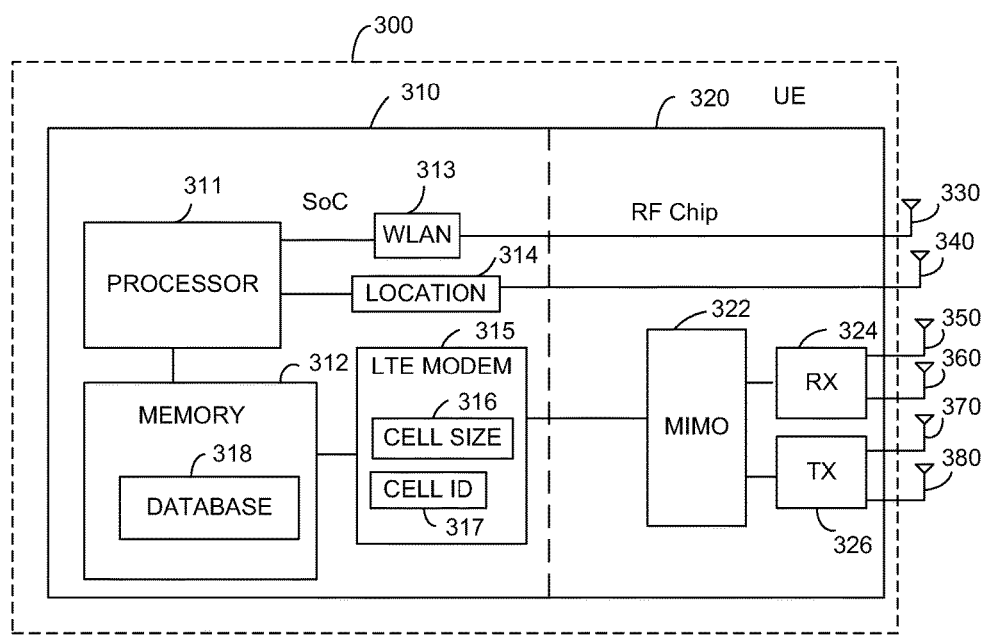
FIG. 3 is a schematic block diagram illustration of a user equipment (UE), in accordance with some demonstrative embodiments.

Reference is made to FIG. 3, which schematically illustrates a UE 300, in accordance with some demonstrative embodiments. For example, UE 300, may include a system on chip (SoC) 310 and a radio frequency (RF) chip 320, an antenna 330 for a WLAN modem 313, a receiver antenna 340 for a location services receiver 314, and antennas 350, 360, 370 and 380 to be used with an LTE radio.

Figure 2:
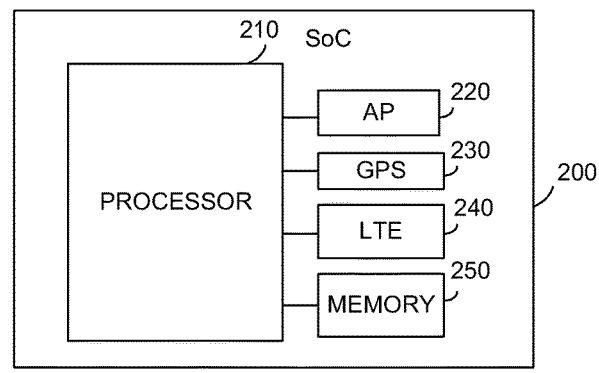
FIG. 2 is a schematic block diagram illustration of a system on chip (SoC), in accordance with some demonstrative embodiments.

In some demonstrative embodiments, SoC 310 may include one or more components similar to components of SoC 200 (FIG. 2). For example, SoC 300 may include an application processor 311, a memory 312, which may include a database 318, a WLAN modem 313 to be in communication with an AP through antenna 330, a location system receiver 314, e.g., GPS, to receive location signals through antenna 340, and a LTE modem 315. LTE modem 315 may include processor circuitry and/or logic (not shown), radio circuitry and/or logic (not shown) to receive and/or transmit signals through RF chip 320, and memory circuitry and/or logic (not shown) to store a cell size parameter 315 and a cell ID parameter 317. Database 318 may include a list of WLAN APs in the vicinity of UE 300, if desired.

RF chip 310 may include multiple-input-multiple-output (MIMO) circuitry and/or logic 322, a receiver (RX) circuitry 324, and a transmitter (TX) circuitry 326. It should be understood that other RF circuitries such as a baseband, power amplifiers, circuitries and/or logic to support GPS, Bluetooth, 60 GHz WLAN, and the like, may be included in RF chip 320.

Antennas 330, 340, 350, 360, 370, 380 may include an antenna array, a dipole antenna, a Yagi antenna, an internal antenna, a costume designed antenna or the like.

In some demonstrative embodiments, UE 300 may be configured to implement one or more of the embodiments, which are described above with reference to FIGS. 1 and/or 2, and/or the methods described below with reference to FIGS. 4, 5 and/or 6.

Figure 4:
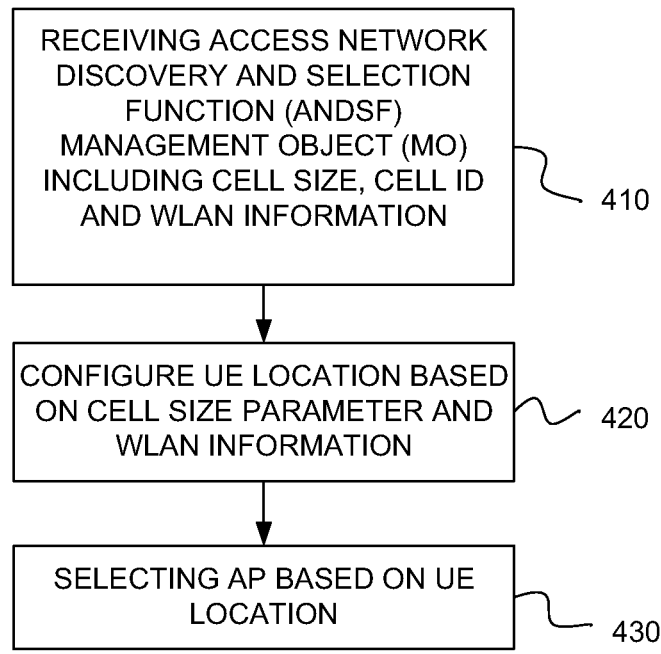
FIG. 4 is a schematic flow-chart illustration of a method of positioning a UE, in accordance with some demonstrative embodiments.

Reference is made to FIG. 4, which schematically illustrates a method of positioning a UE, for example, UE 300 (FIG. 3), in accordance with some demonstrative embodiments. In some demonstrative embodiments, one or more operations of the method of FIG. 4 may be used with an ANDSF, for example, an ANDSF, which may be enhanced to carry cell size information according to some demonstrative embodiments. In one example, the ANDSF may be enhanced to carry the cell size information, e.g., as follows:

5.5.xx  <X>/DiscoveryInformation/<X>/AccessNetwork-
Area/3GPP_Location/<X>/CELL_SIZE The CELL_SIZE leaf indicates a GERAN, UTRAN or E-UTRAN cell size information for one particular 3GPP network related location description.

Occurrence: ZeroOrOne

Format: bin

Access Types: Get, Replace

Values: <Cell Size>

As indicated at block 410, an example of the method of positioning a UE using the ANDSF function may begin with the UE, e.g., UE 300 (FIG. 3), receiving an ANDSF MO, which includes the cell size parameter and the WLAN information.

As indicated at block 420, the UE may configure its position based on the cell size parameter, e.g., cell size 316 (FIG. 3), and the WLAN information.

As indicated at block 430, the UE may select an AP of the WLAN based on the UE position. For example, the UE may search a database, e.g., database 318 (FIG. 3), for APs located in the vicinity of the UE, e.g., UE 300 (FIG. 3), and may connect to the WLAN AP, which is in the closest vicinity to the UE through WLAN modem 313 (FIG. 3), if desired.

Figure 5:
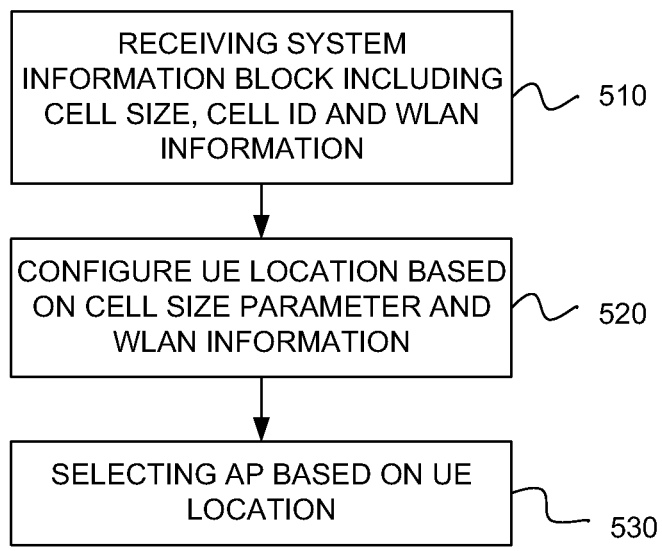
FIG. 5 is a schematic flow-chart illustration of a method of positioning a UE, in accordance with some demonstrative embodiments.

Reference is made to FIG. 5, which schematically illustrates a method of positioning a UE, in accordance with some demonstrative embodiments. According to one example, one or more of the operations of the method of FIG. 5 may use radio resource control (RRC) System Information Block (SIB) signaling, if desired, e.g., as described below.

System information in LTE systems and UMTS may be separated into the master information block (MIB) and a number of SIBs. Each MIB and SIB may include a specified type of information. For example, in LTE, the MIB may include physical layer information, and SIB type 1 (SIB1) may include access restrictions and SIB scheduling information. Certain system information (e.g., MIB or SIB1) may be a prerequisite (i.e., read) to extract or read other system information or SIBs. Common and shared channel information in a SIB type 2 (SIB2) can be used in a random access procedure or a random access channel (RACH).

For cell search and selection in LTE systems, the mobile device may read the physical broadcast channel (PBCH) in the physical layer, and may extract the information from the MIB. The MIB may carry important system information, which may be submitted by the logical broadcast control channel (BCCH) in the radio link control layer via the broadcast channel (BCH) in the medium access control (MAC) layer mapped onto the PBCH. With the information from the MIB, the mobile device may be informed about the transmission bandwidth configuration in downlink of the cell. Other SIBs may provide system information sent via Physical Downlink Shared Channel (PDSCH).

In some demonstrative embodiments, one or more SIBs may be enhanced to carry the cell size information. For example, SIB type 3, 4, 5, 6, 7 and/or 8, and/or any other SIB, may be enhanced to include a cell size information element (IE), which may include the cell size information, e.g., as described below.

In another example and according to a demonstrative embodiment, a new, dedicated, SIB type, e.g., SIB type 16 or any other SIB type, may be defined to include a cell size IE, as described below.

In some demonstrative embodiments, the SIB may include the cell size IE, e.g., as follows:
SystemInformationBlockTypexx
  The IE SystemInformationBlockType16 contains information relevant only for inter-RAT mobility and network selection/re-selection, i.e. information about WLAN networks.
SystemInformationBlockTypexx information element

```
-- ASN1START
SystemInformationBlockTypexx ::=SEQUENCE {
  cellSize   INTEGER (1..100000)
-- ASN1STOP
```

SystemInformationBlockTypexx field descriptions
cellSize—Contains the cell radius in meters.

For example, the Cell size information may be expressed either explicitly in meters, e.g., the cell size radius in Meters, or as an ENUMERATED type containing a cell size selected from several predefined cell sizes, or in any other way, if desired.

As indicated at block 510, the method may include receiving at the UE, e.g., UE 300 (FIG. 3), an SIB, e.g., the SIB type 16, including the cell size parameter and the WLAN information.

As indicated at block 520, the UE may configure it position based on the cell size, e.g., cell size 316 (FIG. 3).

As indicated at block 530, the UE may select the AP of the WLAN based on the UE position and the WLAN information. For example, the UE may search a database, e.g., database 318 (FIG. 3), for APs location in the vicinity of the UE, e.g., UE 300 (FIG. 3), and may connect to the WLAN AP, which is in the closest vicinity to the UE. For example UE 300 (FIG. 3) may connect to the WLAN AP through WLAN modem 313 (FIG. 3), if desired.

Figure 6:
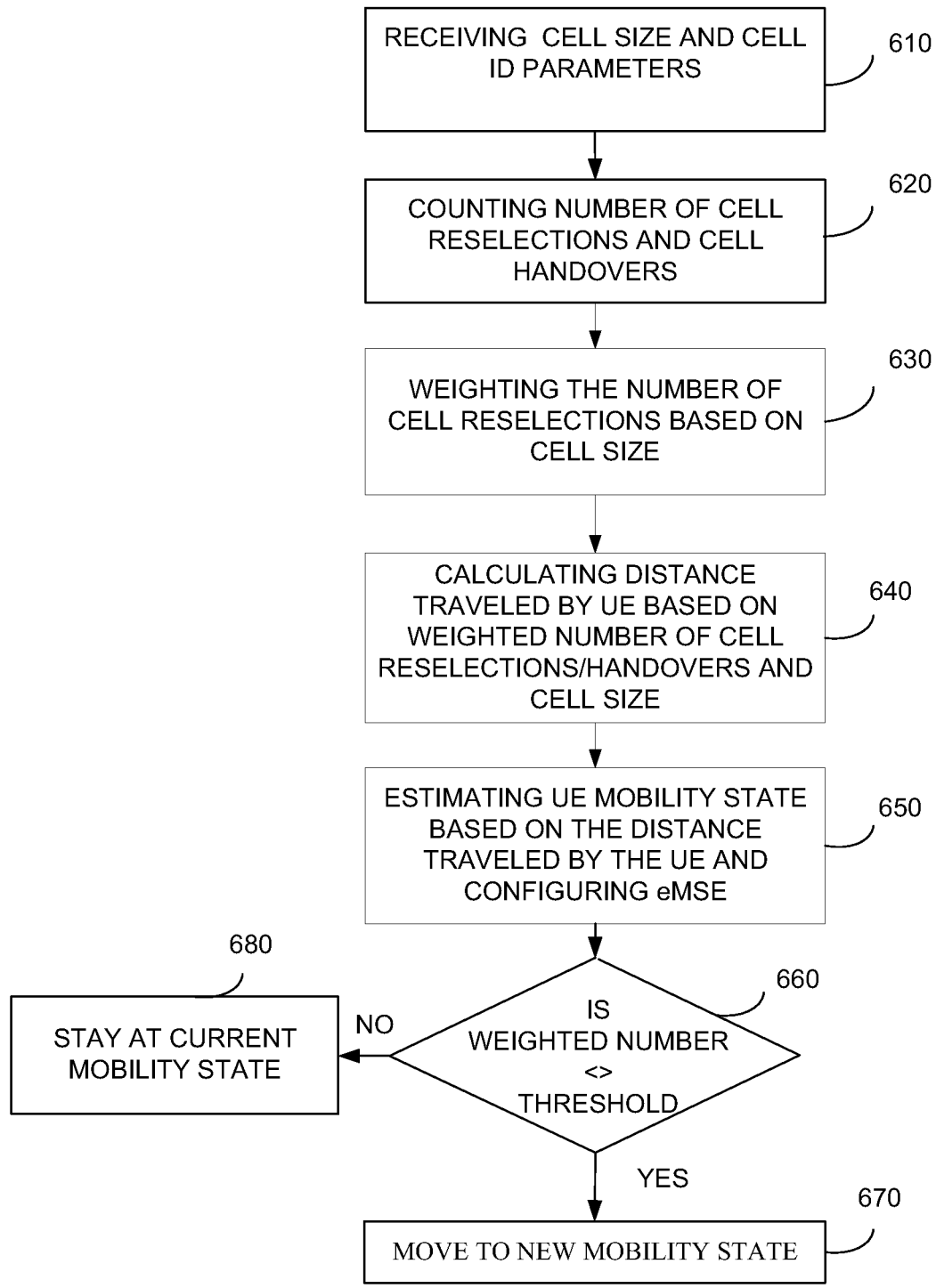
FIG. 6 is a schematic flow-chart illustration of a method of estimating a mobility state of a UE, in accordance with some demonstrative embodiments.

Reference is made to FIG. 6, which schematically illustrates a method of estimating a mobility state of a UE e.g., UE 300 (FIG. 3), in accordance with some demonstrative embodiments.

As indicated at block 610, the UE may receive, e.g., from an eNB, a cell ID parameter, e.g., cell ID 317 (FIG. 3) and a cell size parameter, e.g., cell size 316 (FIG. 3).

As indicated at block 620, the UE may count a number of cell reselections and/or the cell handovers while traveling.

As indicated at block 630, the UE may determine a weighted number of cell reselections and/or the cell handovers based on the cell size.

As indicated at block 640, the UE may calculate and/or estimate the distance traveled by the UE, for example, based on the weighted number.

According to this example, the UE may estimate a UE mobility state based on the cell ID, e.g., cell ID 317 (FIG. 3), and the cell size, e.g., cell size 316 (FIG. 3).

As indicated at block 650, the UE may configure an enhanced mobility state estimation (eMSE), and may estimate the UE mobility state based on the distance traveled by the UE.

As indicated at block 660, the UE may compare the weighted number to a mobility state threshold.

As indicated at block 670, if the mobility threshold is met, the UE may move to a new mobility state, e.g., a normal state, a high state or a medium state.

As indicated at block 680, if the mobility threshold is not met, the UE may stay at the current mobility state, e.g., the normal state, the high state or the medium state.

In another example, the UE may decide whether to connect or disconnect to the AP based on the eMSE. The UE may decide of a next cell reselection based on the eMSE, if desired.

Figure 7:
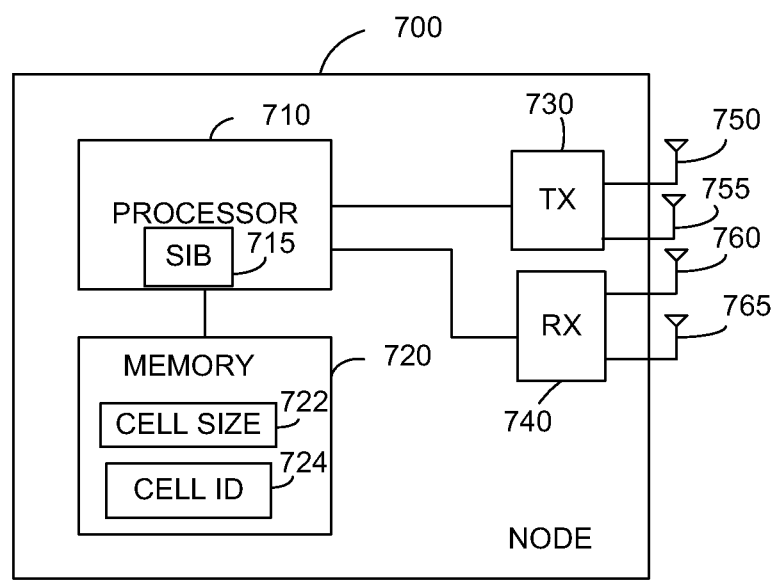
FIG. 7 is a schematic illustration of a node in accordance with some demonstrative embodiments.

Reference is made to FIG. 7, which schematically illustrates a node 700, in accordance with some demonstrative embodiments. For example, node 700 may include a processor circuitry and/or logic 710, a memory circuitry and/or logic 720, a transmitter (TX) circuitry and/or logic 730, a receiver circuitry and/or logic 740 and plurality of antennas 750, 755, 760, 766.

According to some demonstrative embodiments, node 700 may include an eNB configured to control a cell. Node 700 may be configured to provide location information to a UE, e.g., a cellular phone, if desired. Node 700 may store cellular information, for example, the cell ID and the cell size of the cell in memory 720. For example, memory 720 may store a cell size parameter 722 and a cell ID parameter 724.

According to some demonstrative embodiments, processor 710 may include the cell size parameter 722 in an information element of a SIB 715 e.g., an SIB type 16 as described above. Processor 710 may send SIB 715 to TX 730. TX 730 is configured to transmit cell ID parameter 724 and SIB 715. For example, SIB 715 may include the cell size parameter 722 and wireless local area network (WLAN) information. TX 730 may transmit SIB 715 and cell ID 724 to the UE via antennas 750 and 755. RX 740 may receive a feedback message from the UE via antennas 760 and 765, if desired.

Figure 8:
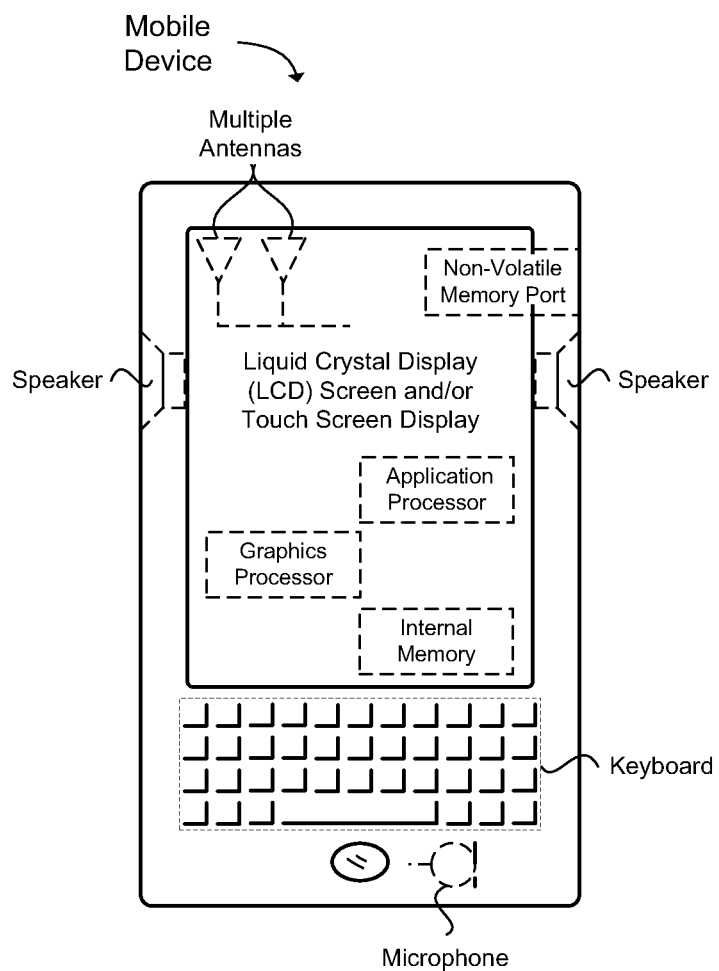
FIG. 8 is a schematic illustration of a mobile device in accordance with some demonstrative embodiments.

Reference is made to FIG. 8, which schematically illustrates a mobile device, in accordance with some demonstrative embodiments. The mobile device may include, for example, a user equipment (UE), a mobile station (MS), a mobile wireless device, a cell phone, a Smartphone, a mobile communication device, a tablet, a handset, or other type of mobile wireless device. The mobile device can include one or more antennas configured to communicate with a transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device may be configured to communicate using at least one wireless communication standard including 3GPP LTE, 3GPP UMTS, GSM, WiMAX, High Speed Packet Access (HSPA), Bluetooth, and WiFi. The mobile device may communicate using separate antennas for each wireless communication standard or shared antennas for multiple wireless communication standards. The mobile device may communicate in a WLAN, a wireless personal area network (WPAN), and/or a WWAN.

FIG. 8 also provides an illustration of a microphone and one or more speakers that may be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor may be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 9:
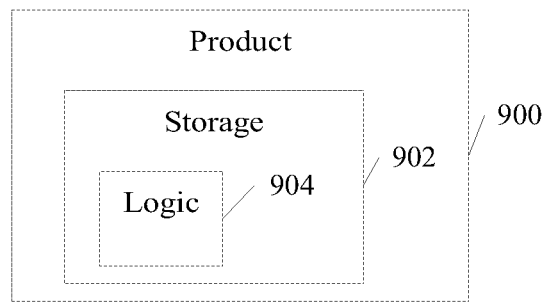
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include a non-transitory machine-readable storage medium 902 to store logic 904, which may be used, for example, to perform at least part of the functionality of one or more elements of system 100 (FIG. 1), one or more elements of SoC 200 (FIG. 2), one or more elements of UE 300 (FIG. 3), one or more elements of mobile device of FIG. 8, and/or to perform one or more operations of the method of FIGS. 4, 5, and/or 6. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a method performed by a user equipment (UE) to configure a position of the UE, the method comprising receiving a cell identification (ID) parameter of a cell; receiving a cell size parameter of the cell; configuring a cell location of the cell based on the cell ID parameter; and determining the position of the UE according to the cell location and the cell size parameter.

Example 2 includes the subject matter of Example 1, and optionally, wherein the cell size parameter comprises a radius of the cell.

Example 3 includes the subject matter of Example 1 or 2, and optionally, comprising receiving a system information block (SIB), wherein the SIB includes the cell size parameter and wireless local area network (WLAN) information; and selecting a WLAN access point (AP) based on the UE position and the WLAN information.

Example 4 includes the subject matter of Example 3, and optionally, wherein selecting the WLAN AP comprises searching a database for APs located in the vicinity of the UE; and connecting to a WLAN AP, which is in the closest vicinity to the UE.

Example 5 includes the subject matter of Example 1 or 2, and optionally, comprising receiving an Access Network Discovery and Selection Function (ANDSF) Management Object (MO), wherein the ANDSF MO includes the cell size parameter and wireless local area network (WLAN) information; and selecting a WLAN access point (AP) based on the UE position.

Example 6 includes the subject matter of Example 5, and optionally, wherein selecting the WLAN AP comprises searching a database for APs located in the vicinity of the UE; and connecting to a WLAN AP, which is in the closest vicinity to the UE.

Example 7 includes the subject matter of any one of Examples 1-6, and optionally, wherein determining the position of the UE comprises providing the cell size parameter as a boundary condition for multilateration or trilateration position equations.

Example 8 includes the subject matter of any one of Examples 1-7, and optionally, comprising estimating a UE mobility state of the UE based on the cell ID and the cell size, and configuring an enhanced mobility state estimation (eMSE); and deciding whether to connect to, or to disconnect from, a wireless local area network (WLAN) access point (AP) based on the eMSE.

Example 9 includes the subject matter of Example 8, and optionally, wherein estimating the UE mobility state comprises counting a number of cell reselections and cell handovers; counting a number of cell sizes of reelected cells and handed over cells; weighting the number of cell reselections and cell handovers with the number of cell sizes to provide a weighted number; comparing the weighted number to a mobility state threshold; and if the mobility threshold is met, moving the UE to a new mobility state.

Example 10 includes the subject matter of Example 8, and optionally, wherein estimating the UE mobility state comprises estimating the UE mobility state based on a distance traveled by the UE, wherein the distance is calculated based on the number of cell reselections and cell handovers weighted with the sum of cell sizes of the reselected cells and handed over cells.

Example 11 includes the subject matter of any one of Examples 8-10, and optionally, wherein the UE mobility state is selected from a normal state, a high state and a medium state.

Example 12 includes the subject matter of any one of Examples 8-11, and optionally, comprising making a decision of next cell reselection based on the eMSE.

Example 13 includes the subject matter of any one of Examples 1-12, and optionally, comprising receiving a global positioning system (GPS) signal; applying a Kalman filter to the cell size and the GPS signal; and estimating the UE position using the Kalman filter.

Example 14 includes a computer program product, comprising a non-transitory computer readable storage medium having a computer readable program code embodied therein, the computer readable program code adapted to be executed by a user equipment (UE) to implement a method of configuring UE position, the method comprising receiving a cell identification (ID) parameter of a cell; receiving a cell size parameter of the cell; configuring a cell location of the cell based on the cell ID parameter; and determining the position of the UE according to the cell location and the cell size parameter.

Example 15 includes the subject matter of Example 14, and optionally, wherein the cell size parameter comprises a radius of the cell.

Example 16 includes the subject matter of any one of Examples 14 and 15, and optionally, wherein the method comprises receiving a system information block (SIB), wherein the SIB includes the cell size parameter and wireless local area network (WLAN) information; and selecting a WLAN Access point (AP) based on the UE position and the WLAN information.

Example 17 includes the subject matter of Example 16, and optionally, wherein selecting the WLAN AP comprises searching a database for APs located in the vicinity of the UE; and connecting to a WLAN AP, which is in the closest vicinity to the UE.

Example 18 includes the subject matter of any one of Examples 14 and 15, and optionally, wherein the method comprises receiving Access Network Discovery and Selection Function (ANDSF) Management Object (MO), wherein the ANDSF MO includes the cell size parameter and wireless local area network (WLAN) information; and selecting an access point (AP) of the WLAN based on the UE position.

Example 19 includes the subject matter of Example 18, and optionally, wherein selecting the WLAN AP comprises searching a database for APs located in the vicinity of the UE; and connecting a WLAN AP, which is in the closest vicinity to the UE.

Example 20 includes the subject matter of any one of Examples 14-19, and optionally, wherein determining the position of the UE comprises providing the cell size parameter as a boundary condition for multilateration or trilateration position equations.

Example 21 includes the subject matter of any one of Examples 14-20, and optionally, wherein the method comprises estimating a UE mobility state of the UE based on the cell ID and the cell size, and configuring an enhanced mobility state estimation (eMSE); and deciding whether to connect to, or disconnect from, a wireless local area network (WLAN) access point (AP) based on the eMSE.

Example 22 includes the subject matter of Example 21, and optionally, wherein estimating further comprises counting a number of cell reselections and cell handovers; counting a number of cell sizes of reelected cells and handed over cells; weighting the number of cell reselections and cell handovers with the number of cell sizes to provide a weighted number; comparing the weighted number to a mobility state threshold; and if the mobility threshold is met, moving the UE to a new mobility state.

Example 23 includes the subject matter of Example 21, and optionally, wherein estimating comprises estimating the UE mobility state based on a distance traveled by the UE, wherein the distance is calculated based on the number of cell reselections and cell handovers weighted with the sum of cell sizes of the reselected cells and handed over cells.

Example 24 includes the subject matter of any one of Examples 20-23, and optionally, wherein the UE mobility state is selected from a normal state, a high state and a medium state.

Example 25 includes the subject matter of any one of Examples 20-24, and optionally, wherein a UE decision of next cell reselection is based on the eMSE.

Example 26 includes the subject matter of any one of Examples 14-25, and optionally, wherein the method comprises receiving a global positioning system (GPS) signal; applying a Kalman filter to the cell size and the GPS signal; and estimating the UE position using the Kalman filter.

Example 27 includes a system on chip (SoC) to configure a user equipment (UE) position, the SoC comprising Long Term Evaluation (LTE) modem circuitry configured to receive a cell identification (ID) parameter and a cell size parameter, to configure a cell location based on the cell ID parameter, and to determine the UE position according to the cell location and the cell size parameter.

Example 28 includes the subject matter of Example 27, and optionally, wherein the cell size parameter comprises a radius of the cell.

Example 29 includes the subject matter of Example 27 or 28, and optionally, wherein the LTE modem circuitry is configured to receive a system information block (SIB), wherein the SIB includes the cell size parameter and wireless local area network (WLAN) information, the LTE modem circuitry configured to select an access point (AP) of the WLAN based on the UE position and the WLAN information.

Example 30 includes the subject matter of Example 29, and optionally, comprising memory circuitry having a database of APs; processor circuitry configured to search the database for APs located in the vicinity of the UE; and WLAN modem circuitry configured to connect to a WLAN AP, which is in the closest vicinity to the UE.

Example 31 includes the subject matter of Example 27 or 28, and optionally, wherein the LTE modem circuitry is configured to receive an Access Network Discovery and Selection Function (ANDSF) Management Object (MO), wherein the ANDSF MO includes the cell size parameter and wireless local area network (WLAN) information, and to select an access point (AP) of the WLAN based on the UE position.

Example 32 includes the subject matter of Example 31, and optionally, comprising memory circuitry having a database of APs; processor circuitry configured to search the database for APs located in the vicinity of the UE; and WLAN modem circuitry configured to connect to a WLAN AP, which is in the closest vicinity to the UE.

Example 33 includes the subject matter of any one of Examples 27-32, and optionally, wherein the LTE modem circuitry is determine the UE position by providing the cell size parameter as a boundary condition for a multilateration or trilateration position equations.

Example 34 includes the subject matter of any one of Examples 27-33, and optionally, wherein the LTE modem circuitry is configured to estimate a UE mobility state based on the cell ID and the cell size, to configure an enhanced mobility state estimation (eMSE), and to decide whether to connect or to disconnect from a wireless local area network (WLAN) access point (AP) based on the eMSE.

Example 35 includes the subject matter of Example 34, and optionally, wherein the LTE modem circuitry is configured to count a number of cell reselections and cell handovers, to count a number of cell sizes of reelected cells and handed over cells, to weigh the number of cell reselections and cell handovers with the number of cell sizes to provide a weighted number, to compare the weighted number to a mobility state threshold, and, if the mobility threshold is met, to move the UE to a new mobility state.

Example 36 includes the subject matter of Example 3434, and optionally, wherein the LTE modem circuitry is configured to estimate the UE mobility state based on a distance traveled by the UE, wherein the distance is calculated based on the number of cell reselections and cell handovers weighted with the sum of cell sizes of the reselected cells and handed over cells.

Example 37 includes the subject matter of any one of Examples 34-36, and optionally, wherein the UE mobility state is selected from a normal state, a high state and a medium state.

Example 38 includes the subject matter of any one of Examples 34-37, and optionally, wherein an UE decision of next cell reselection is based on the eMSE.

Example 39 includes the subject matter of any one of Examples 27-38, and optionally, comprising location receiver circuitry configured to receive a global positioning system (GPS) signal, wherein LTE modem circuitry is configured to enter the cell size and the GPS signal to a Kalman filter and to estimate the UE position using the Kalman filter.

Example 40 includes a user equipment (UE) comprising a radio frequency (RF) chip configured to receive and transmit RF signals of a cellular system; two or more antennas operably connected to the RF chip; and a system on chip (SoC) operably connected to the RF chip and configured to receive a cell identification (ID) parameter and a cell size parameter, to configure a cell location based on the cell ID parameter, and to determine a position of the UE according to the cell location and the cell size parameter.

Example 41 includes the subject matter of Example 40, and optionally, wherein the cell size parameter comprising a radius of the cell.

Example 42 includes the subject matter of Example 40 or 41, and optionally, wherein the SoC is configured to receive a system information block (SIB), wherein the SIB includes the cell size parameter and wireless local area network (WLAN) information, the SoC being configured to select a WLAN Access Point (AP) based on the UE position and the WLAN information.

Example 43 includes the subject matter of Example 42 wherein the SoC is configured to search a database for APs located in the vicinity of the UE, and to connect to a WLAN AP which is in the closest vicinity to the UE.

Example 44 includes the subject matter of Example 40 or 41, and optionally, wherein the SoC is configured to receive an Access Network Discovery and Selection Function (ANDSF) Management Object (MO), wherein the ANDSF MO includes the cell size parameter and wireless local area network (WLAN) information, the SoC being configured to select a WLAN Access point (AP) based on the UE position.

Example 45 includes the subject matter of Example 44, and optionally, wherein the SoC is configured to search a database for APs located in the vicinity of the UE, and to connect to a WLAN AP which is in the closest vicinity to the UE.

Example 46 includes the subject matter of any one of Examples 40-45, and optionally, wherein the SoC is to determine the UE position by providing the cell size parameter as a boundary condition for multilateration or trilateration position equations.

Example 47 includes the subject matter of any one of Examples 40-46, and optionally, wherein the SoC is configured to estimate a UE mobility state based on the cell ID and the cell size, to configure an enhanced mobility state estimation (eMSE), and to decide whether to connect to, or to disconnect from, a wireless local area network (WLAN) access point (AP) based on the eMSE.

Example 48 includes the subject matter of Example 47, and optionally, wherein the SoC is configured to count a number of cell reselections and cell handovers, to count a number of cell sizes of reelected cell and handed over cells, to weigh the number of cell reselections and cell handovers with the number of cell sizes to provide a weighted number, to compare the weighted number to a mobility state threshold, and, if the mobility threshold is met, to move the UE to a new mobility state.

Example 49 includes the subject matter of Example 47, and optionally, wherein the SoC is configured to estimate the UE mobility state based on a distance traveled by the UE, wherein the distance is calculated based on the number of cell reselections and cell handovers weighted with the sum of cell sizes of the reselected cells and handed over cells.

Example 50 includes the subject matter of any one of Examples 47-49, and optionally, wherein the UE mobility state is selected from a normal state, a high state and a medium state.

Example 51 includes the subject matter of any one of Examples 47-50, and optionally, wherein a UE decision of next cell reselection is based on the eMSE.

Example 52 includes the subject matter of any one of Examples 40-51 wherein the SoC is configured to receive a global positioning system (GPS) signal, to enter the cell size and the GPS signal to a Kalman filter, and to estimate the UE position using the Kalman filter.

Example 53 includes a method performed at a User Equipment (UE) to estimate a mobility state of the UE, the method comprising receiving by the UE a cell size and a cell ID; estimating the mobility state of the UE based on the cell ID and the cell size, and configuring an enhanced mobility state estimation (eMSE); and deciding whether to connect to, or to disconnect from, a wireless local area network (WLAN) access point (AP) based on the eMSE.

Example 54 includes the subject matter of Example 53, and optionally, wherein estimating the UE mobility state comprises counting a number of cell reselections and cell handovers; counting a number of cell sizes of reelected cells and handed over cells; weighting the number of cell reselections and cell handovers with the number of cell sizes to provide a weighted number; comparing the weighted number to a mobility state threshold; and if the mobility threshold is met, moving the UE to a new mobility state.

Example 55 includes the subject matter of Example 53, and optionally, wherein estimating the UE mobility state comprises estimating the UE mobility state based on a distance traveled by the UE, wherein the distance is calculated based on the number of cell reselections and cell handovers weighted with the sum of cell sizes of the reselected cells and handed over cells.

Example 56 includes the subject matter of any one of Examples 53-55, and optionally, wherein the UE mobility state is selected from a normal state, a high state and a medium state.

Example 57 includes the subject matter of any one of Examples 53-56, and optionally, comprising making a decision of next cell reselection based on the eMSE.

Example 58 includes a computer program product, comprising a non-transitory computer readable storage medium having a computer readable program code embodied therein, the computer readable program code adapted to be executed by a user equipment (UE) to implement a method of estimating a mobility state of the UE, the method comprising receiving by the UE a cell size and a cell ID; estimating the mobility state of the UE based on the cell ID and the cell size, and configuring an enhanced mobility state estimation (eMSE); and deciding whether to connect to or to disconnect from a wireless local area network (WLAN) access point (AP) based on the eMSE.

Example 59 includes the subject matter of Example 58, and optionally, estimating the UE mobility state comprises counting a number of cell reselections and cell handovers; counting a number of cell sizes of reelected cells and handed over cells; weighting the number of cell reselections and cell handovers with the number of cell sizes to provide a weighted number; comparing the weighted number to a mobility state threshold; and if the mobility threshold is met, moving the UE to a new mobility state.

Example 60 includes the subject matter of Example 58, and optionally, estimating the UE mobility state comprises estimating the UE mobility state based on a distance traveled by the UE, wherein the distance is calculated based on the number of cell reselections and cell handovers weighted with the sum of cell sizes of the reselected cells and handed over cells.

Example 61 includes the subject matter of any one of Examples 58-60, and optionally, wherein the UE mobility state is selected from a normal state, a high state and a medium state.

Example 62 includes the subject matter of any one of Examples 58-61, and optionally, wherein the method comprises making a decision of next cell reselection based on the eMSE.

Example 63 includes a system on chip (SoC) semiconductor product to estimate a mobility state of a user equipment (UE), the SoC comprising LTE modem circuitry configured to receive a cell ID and a cell size, to estimate an UE mobility state based on the cell ID and the cell size, to configure an enhanced mobility state estimation (eMSE), and to decide whether to connect to, or to disconnect from, a wireless local area network (WLAN) access point (AP) based on the eMSE.

Example 64 includes the subject matter of Example 63, and optionally, wherein the LTE modem circuitry is configured to count a number of cell reselections and cell handovers, to count a number of cell sizes of reelected cell and handed over cells, to weigh the number of cell reselections and cell handovers with the number of cell sizes to provide a weighted number, to compare the weighted number to a mobility state threshold, and, if the mobility threshold is met, to move the UE to a new mobility state.

Example 65 includes the subject matter of Example 63, and optionally, wherein the LTE modem circuitry is configured to estimate the UE mobility state based on a distance traveled by the UE, wherein the distance is calculated based on the number of cell reselections and cell handovers weighted with the sum of cell sizes of the reselected cells and handed over cells.

Example 66 includes the subject matter of any one of Examples 63-65, and optionally, wherein the UE mobility state is selected from a normal state, a high state and a medium state.

Example 67 includes the subject matter of any one of Examples 63-66, and optionally, wherein a UE decision of next cell reselection is based on the eMSE.

Example 68 includes a user equipment (UE) to estimate a UE mobility state, the UE comprising a system on chip (SoC) semiconductor product configured to receive a cell ID and a cell size, to estimate the UE mobility state based on the cell ID and the cell size, to configure an enhanced mobility state estimation (eMSE), and to decide whether to connect to, or to disconnect from, a wireless local area network (WLAN) access point (AP) based on the eMSE.

Example 69 includes the subject matter of Example 68, and optionally, wherein the SoC is configured to count a number of cell reselections and cell handovers, to count a number of cell sizes of reelected cell and handed over cells, to weigh the number of cell reselections and cell handovers with the number of cell sizes to provide a weighted number, to compare the weighted number to a mobility state threshold, and, if the mobility threshold is met to move the UE to a new mobility state.

Example 70 includes the subject matter of Example 68, and optionally, wherein the SoC is configured to estimate the UE mobility state based on a distance traveled by the UE, wherein the distance is calculated based on the number of cell reselections and cell handovers weighted with the sum of cell sizes of the reselected cells and handed over cells.

Example 71 includes the subject matter of any one of Examples 68-70, and optionally, wherein the UE mobility state is selected from a normal state, a high state and a medium state.

Example 72 includes the subject matter of any one of Examples 68-71, and optionally, wherein a UE decision of next cell reselection is based on the eMSE.

Example 73 includes a method performed by a node to provide location information to a user equipment (UE), the method comprising transmitting a cell identification (ID) parameter of a cell; and transmitting a system information block (SIB), wherein the SIB includes a cell size parameter of the cell, and wireless local area network (WLAN) information.

Example 74 includes the subject matter of Example 73, and optionally, wherein the cell size parameter comprises a radius of the cell.

Example 75 includes the subject matter of Example 73 or 74, and optionally, wherein the SIB comprises a SIB type 16.

Example 76 includes a computer program product comprising a non-transitory computer readable storage medium having a computer readable program code embodied therein, the computer readable program code adapted to be executed by node to implement a method comprising transmitting a cell identification (ID) parameter of a cell; and transmitting a system information block (SIB), wherein the SIB includes a cell size parameter of the cell, and wireless local area network (WLAN) information.

Example 77 includes the subject matter of Example 76, and optionally, wherein the cell size parameter comprises a radius of the cell.

Example 78 includes the subject matter of Example 76 or 77, and optionally, wherein the SIB comprises a SIB type 16.

Example 79 includes a node configured to provide location information to a User Equipment (UE), the node comprising memory circuitry to store cell location information; and transmitter circuitry configured to transmit a cell identification (ID) parameter of a cell, and a system information block (SIB), wherein the SIB includes a cell size parameter of the cell, and wireless local area network (WLAN) information.

Example 80 includes the subject matter of Example 79, and optionally, wherein the cell size parameter comprises a radius of the cell.

Example 81 includes the subject matter of Example 79 or 80, and optionally, wherein the SIB comprises a SIB type 16.

Example 82 includes the subject matter of any one of Examples 79-81 being an evolved node B (eNB).

Example 83 includes a wireless communication system configured to provide location information, the wireless communication system comprising a node having memory circuitry to store a cell location information, and transmitter circuitry configured to transmit a cell identification (ID) parameter of a cell and a system information block (SIB), wherein the SIB includes a cell size parameter of the cell and wireless local area network (WLAN) information.

Example 84 includes the subject matter of Example 83, and optionally, wherein the cell size parameter comprises a radius of the cell.

Example 85 includes the subject matter of Example 83 or 84, and optionally, wherein the SIB comprises a SIB type 16.

Example 86 includes the subject matter of any one of Examples 83-86, and optionally, wherein the node comprises an evolved node B (eNB).

Example 87 includes a method performed by a user equipment (UE), the method comprising receiving a cell identification (ID) parameter of a cell; and receiving a system information block (SIB), wherein the SIB includes a cell size parameter of the cell, and wireless local area network (WLAN) information.

Example 88 includes the subject matter of Example 87, and optionally, wherein the cell size parameter comprises a radius of the cell.

Example 89 includes the subject matter of Example 87 or 88, and optionally, wherein the SIB comprises a SIB type 16.

Example 90 includes a computer program product comprising a non-transitory computer readable storage medium having a computer readable program code embodied therein, the computer readable program code adapted to be executed by a user equipment (UE) to implement a method of receiving location information, the method comprising receiving a cell identification (ID) parameter of a cell; and receiving a system information block (SIB), wherein the SIB includes a cell size parameter of the cell, and wireless local area network (WLAN) information.

Example 91 includes the subject matter of Example 90, and optionally, wherein the cell size parameter comprises a radius of the cell.

Example 92 includes the subject matter of Example 90 or 91, and optionally, wherein the SIB comprises a SIB type 16.

Example 93 includes a user equipment (UE) configured to receive location information from a node, the UE comprising a radio frequency (RF) chip having receiver circuitry configured to receive a cell identification (ID) parameter of a cell and a system information block (SIB), wherein the SIB includes a cell size parameter of the cell, and wireless local area network (WLAN) information; and a system on chip having processor circuitry configured to process the cell size and the cell ID.

Example 94 includes the subject matter of Example 93, and optionally, wherein the cell size parameter comprises a radius of the cell.

Example 95 includes the subject matter of Example 93 or 94, and optionally, wherein the SIB comprises a SIB type 16.

Example 96 includes the subject matter of any one of Examples 93-95 being a tablet.

Example 97 includes a wireless communication system comprising a user equipment (UE) operably connected to at least two dipole antennas, the UE configured to receive from a node a cell identification (ID) parameter of a cell and a system information block (SIB), wherein the SIB includes a cell size parameter of the cell, and wireless local area network (WLAN) information.

Example 98 includes the subject matter of Example 97, and optionally, wherein the cell size parameter comprises a radius of the cell.

Example 99 includes the subject matter of Example 97 or 98, and optionally, wherein the SIB comprises a SIB type 16.

Example 100 includes the subject matter of any one of Examples 97-99, and optionally, wherein the node comprises an evolved node B (eNB).

Example 101 includes the subject matter of any one of Examples 97-100, and optionally, wherein the UE comprises a cellular phone.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example may be referred to herein along with alternatives for the various components thereof. It is understood that such embodiments, examples, and alternatives are not to be construed as defacto equivalents of one another, but are to be considered as separate and autonomous representations.

Furthermore, the described features, structures, or characteristics may be combined in any suitable manner in one or more embodiments.

In the foregoing description, numerous specific details are provided, such as examples of layouts, distances, network examples, etc., to provide a thorough understanding of some demonstrative embodiments. One skilled in the relevant art will recognize, however, that some embodiments can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of some embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. A computer program product, comprising a non-transitory computer readable storage medium having a computer readable program code embodied therein, the computer readable program code adapted to be executed by a user equipment (UE) to implement one or more operations of configuring UE position, the operations comprising:
   receiving a cell identification (ID) parameter of a cell;
   receiving, in a system information block (SIB) or an Access Network Discovery and Selection Function (ANDSF) Management Object (MO), a cell size parameter of the cell;
   configuring a cell location of the cell based on the cell ID parameter; and
   determining the position of the UE according to the cell location and the cell size parameter.

2. The computer program product of claim 1, wherein the cell size parameter comprises a radius of the cell.

3. The computer program product of claim 1, wherein the operations comprise:
   receiving the SIB, wherein the SIB includes the cell size parameter and wireless local area network (WLAN) information; and
   selecting a WLAN access point (AP) based on the UE position and the WLAN information.

4. The computer program product of claim 1, wherein the operations comprise:
   receiving the ANDSF MO, wherein the ANDSF MO includes the cell size parameter and wireless local area network (WLAN) information; and
   selecting an access point (AP) of the WLAN based on the UE position.

5. The computer program product of claim 1, wherein determining the position of the UE comprises:
   providing the cell size parameter as a boundary condition for multilateration or trilateration position equations.

6. The computer program product of claim 1, wherein the operations comprise:
   estimating a UE mobility state of the UE based on the cell ID and the cell size, and configuring an enhanced mobility state estimation (eMSE), wherein the UE mobility state is selected from a normal state, a high state and a medium state;
   counting a number of cell reselections and cell handovers;
   counting a number of cell sizes of reelected cells and handed over cells;
   weighting the number of cell reselections and cell handovers with the number of cell sizes to provide a weighted number;
   comparing the weighted number to a mobility state threshold; and
   if the mobility threshold is met, moving the UE to a new mobility state.

7. The computer program product of claim 1, wherein the operations comprise:
   receiving a global positioning system (GPS) signal;
   applying a Kalman filter to the cell size and the GPS signal; and
   estimating the UE position using the Kalman filter.

8. A system on chip (SoC) to configure a user equipment (UE) position, the SoC comprising:
   Long Term Evaluation (LTE) modem circuitry to receive a cell identification (ID) parameter and a cell size parameter, to configure a cell location based on the cell ID parameter, and to determine the UE position according to the cell location and the cell size parameter;
   memory circuitry having a database of APs;
   processor circuitry to search the database for APs located in a vicinity of the UE; and
   WLAN modem circuitry to connect to a WLAN AP, which is in the closest vicinity to the UE.

9. The SoC of claim 8, wherein the cell size parameter comprises a radius of the cell.

10. The SoC of claim 8, wherein the LTE modem circuitry is to receive a system information block (SIB), wherein the SIB includes the cell size parameter and wireless local area network (WLAN) information, the LTE modem circuitry to select an access point (AP) of the WLAN based on the UE position and the WLAN information.

11. The SoC of claim 8, wherein the LTE modem circuitry is to receive an Access Network Discovery and Selection Function (ANDSF) Management Object (MO), wherein the ANDSF MO includes the cell size parameter and wireless local area network (WLAN) information, and to select an access point (AP) of the WLAN based on the UE position.

12. The SoC of claim 8, wherein the LTE modem circuitry is to determine the UE position by providing the cell size parameter as a boundary condition for multilateration or trilateration position equations.

13. The SoC of claim 8, wherein the LTE modem circuitry is to estimate a UE mobility state based on the cell ID and the cell size, to configure an enhanced mobility state estimation (eMSE), and to decide whether to connect or to disconnect from a wireless local area network (WLAN) access point (AP) based on the eMSE, wherein the UE mobility state is selected from a normal state, a high state and a medium state.

14. The SoC of claim 13, wherein the LTE modem circuitry is to count a number of cell reselections and cell handovers, to count a number of cell sizes of reelected cells and handed over cells, to weigh the number of cell reselections and cell handovers with the number of cell sizes to provide a weighted number, to compare the weighted number to a mobility state threshold, and, if the mobility threshold is met, to move the UE to a new mobility state.

15. The SoC of claim 14, wherein the LTE modem circuitry is to estimate the UE mobility state based on a distance traveled by the UE, wherein the distance is calculated based on the number of cell reselections and cell handovers weighted with a sum of cell sizes of the reselected cells and handed over cells.

16. The SoC of claim 13, wherein a UE decision of next cell reselection is based on the eMSE.

17. The SoC of claim 8, comprising:
location receiver circuitry to receive a global positioning system (GPS) signal, wherein the LTE modem circuitry is to enter the cell size and the GPS signal to a Kalman filter and to estimate the UE position using the Kalman filter.

18. A user equipment (UE) comprising:
a radio frequency (RF) chip to receive and transmit RF signals of a cellular system;
two or more antennas operably connected to the RF chip; and
a system on chip (SoC) operably connected to the RF chip and to receive a cell identification (ID) parameter and a cell size parameter, to configure a cell location based on the cell ID parameter, and to determine a position of the UE according to the cell location and the cell size parameter,
wherein the SoC is to receive the cell size parameter and a system information block (SIB) or an Access Network Discovery and Selection Function (ANDSF) Management Object (MO).

19. The UE of claim 18, wherein the cell size parameter comprises a radius of the cell.

20. The UE of claim 18, wherein the SoC is to receive the SIB wherein the SIB includes the cell size parameter and wireless local area network (WLAN) information, the SoC being to select a WLAN access point (AP) based on the UE position and the WLAN information.

21. The UE of claim 18, wherein the SoC is to receive the ANDSF MO, wherein the ANDSF MO includes the cell size parameter and wireless local area network (WLAN) information, the SoC being to select a WLAN access point (AP) based on the UE position.

22. The UE of claim 18, wherein the SoC is to determine the UE position by providing the cell size parameter as a boundary condition for multilateration or trilateration position equations.

23. The UE of claim 18, wherein the SoC is to estimate a UE mobility state based on the cell ID and the cell size, to configure an enhanced mobility state estimation (eMSE), to count a number of cell reselections and cell handovers, to count a number of cell sizes of reelected cells and handed over cells, to weigh the number of cell reselections and cell handovers with the number of cell sizes to provide a weighted number, to compare the weighted number to a mobility state threshold, and, if the mobility threshold is met, to move the UE to a new mobility state, wherein the UE mobility state is selected from a normal state, a high state and a medium state.

* * * * *

UNITED STATES PATENT AND TRADEMARK OFFICE
CERTIFICATE OF CORRECTION

PATENT NO. : 9,713,073 B2  
APPLICATION NO. : 14/779996  
DATED : July 18, 2017  
INVENTOR(S) : Sirotkin et al.

Page 1 of 1

It is certified that error appears in the above-identified patent and that said Letters Patent is hereby corrected as shown below:

In the Claims

Column 24:
Line 58, replace "Long Term Evaluation" by --Long Term Evolution--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*